United States Patent [19]

Orlicki et al.

[11] Patent Number: 4,855,982
[45] Date of Patent: Aug. 8, 1989

[54] LENS POSITION-SENSING APPARATUS FOR OPTICAL RECORDING SYSTEM

[75] Inventors: David M. Orlicki, Rochester; William T. Fearnside, Fishers, both of N.Y.

[73] Assignee: Eastman Kodak Company, Rochester, N.Y.

[21] Appl. No.: 50,810

[22] Filed: May 18, 1987

[51] Int. Cl.$^4$ ............................................. G11B 7/095
[52] U.S. Cl. ...................................... 369/44; 369/32; 369/54; 369/55
[58] Field of Search ..................... 369/43–46, 369/32–33, 53–55, 58; 358/342; 250/201 DF

[56] References Cited

U.S. PATENT DOCUMENTS

| | | | |
|---|---|---|---|
| 4,092,529 | 5/1978 | Aihara et al. | 369/44 X |
| 4,302,830 | 11/1981 | Hamaoka et al. | 369/44 X |
| 4,327,434 | 4/1982 | Christopher | 369/43 X |
| 4,386,823 | 6/1983 | Musha | 369/45 X |
| 4,419,614 | 12/1983 | Kimura | 369/46 X |
| 4,607,355 | 8/1986 | Koide | 369/44 |
| 4,677,602 | 6/1987 | Okano et al. | 369/33 X |
| 4,773,055 | 9/1988 | Gijzen et al. | 369/44 X |

Primary Examiner—Alan Faber
Assistant Examiner—W. R. Young
Attorney, Agent, or Firm—Warren W. Kurz

[57] ABSTRACT

Apparatus for sensing the instantaneous tracking position of a lens used in an optical read/write head for optically reading and/or writing information on an optical recording element (e.g. an optical disk). Such apparatus includes a variable inductance transducer which is positioned in close proximity to an electrically conductive, movably mounted lens support. As the lens is moved in a direction perpendicular to its optical axis, the lens support moves relative to the transducer, thereby varying the transducer's inductance. Circuit means responsive to the instantaneous transducer inductance provides a signal representative of the instantaneous lens position. Such signal is used to close a position feedback loop which maintains a fixed position of the lens axis relative to the optical axis of the head during sudden movements of the head (e.g. as occurs in during radial access in an optical disk recording system).

5 Claims, 2 Drawing Sheets

LENS POSITION-SENSING APPARATUS FOR OPTICAL RECORDING SYSTEM

BACKGROUND OF THE INVENTION

This invention relates to the field of optical recording and, more particularly, to apparatus for controlling the position of an objective lens in an optical read/write head.

In an optical recording system, data is recorded on an optical recording element in the form of spots or pits arranged along elongated data tracks. Typically, the recording element is in the form of a radiation-sensitive disk which rotates at high speed (e.g. 1800 rpm) past an optical read/write head. the latter serves to focus a laser beam onto the radiation-sensitive surface of the disk, and data is either read or written along closely spaced (e.g. 1 or 2 micron spacing) concentric data tracks. By moving the head in a radial direction, data can be accessed at random from any of the recorded tracks.

In conventional read/write heads, the objective lens used to focus the read/write laser beam is typically mounted for movement in orthogonal directions, i.e. in a first direction perpendicular to the lens axis, and in a second direction parallel to the lens axis. A tracking actuator mechanism, responsive to a tracking error signal, serves to continuously adjust the lateral position of the lens mount so that the focused beam follows a desired data track. Similarly, a focusing actuator mechanism, responsive to a focus error signal, serves to move the objective lens toward and away from the recording element so as to continuously maintain the laser spot in sharp focus. To provide a high frequency response, the objective lens is necessarily of exceptionally low mass, and its movable mounting mechanism has a relatively low spring constant.

In order to minimize the settling time of the objective lens after a rapid radial movement of the read/write head, it is known in the art to provide, in the optical head itself, a transducer for continuously monitoring the instantaneous displacement of the lens axis from the mechanical axis of the write/read head. Such displacement is often represented by a damped oscillating signal which returns to zero only after several milliseconds. This settling time can be dramatically reduced by feeding the output of the lens position-sensing transducer back to the input of a tracking control circuit.

In U.S. Pat. No. 4,302,830, the aforementioned lens position-sensing transducer takes the form of a piezoelectric element. Such element is secured to a leaf spring which supports an objective lens for movement in a tracking direction, i.e. perpendicular to the lens axis. As the leaf spring flexes under the influence of a tracking actuator (which moves the lens support in response to a tracking error signal), such flexure is sensed by the piezoelectric element and a signal is produced which is proportional to the amount of flexure (i.e. lens displacement from a nominal position). Such signal is fed back to a tracking control circuit which controls the tracking position of the lens in a motion feedback manner.

While a piezoelectric lens position transducer may offer certain advantages in sensing the lens position, (e.g. it can also function as a driver for correcting the tracking error), it is relatively difficult to implement with a high degree of reliability. It would be desirable, therefore, to provide a simpler and more reliable mechanism for sensing lens position, one which can detect lens displacement without physically contacting the movable lens support.

SUMMARY OF THE INVENTION

According to the present invention, the disadvantages associated with the prior art lens position-sensing mechanism are overcome by the provision of a sensing apparatus which includes a transducer which exhibits, depending on the relative proximity of an electrically conductive lens holder, a variable inductance. The instantaneous inductance of such transducer is used to develop a lens position signal proportional to the displacement of the objective lens holder relative to a nominal position. Such signal is used to close a position feedback loop which maintains the lens axis in a fixed position relative to the head axis during rapid movement of the head relative to the recording element. Preferably, such transducer comprises a pair of inductance coils positioned in close proximity to a highly electrically conductive portion of a movably mounted lens support. As the lens support moves to maintain track, the inductance of the respective coils varies in accordance with the instantaneous displacement between the coil and the conductive portion of the lens holder.

The invention and its various advantages will become more evident to those skilled in the art from the ensuing description of preferred embodiment, reference being made to the accompanying drawings.

DETAILED DESCRIPTION OF PREFERRED EMBODIMENTS

Figure 1:
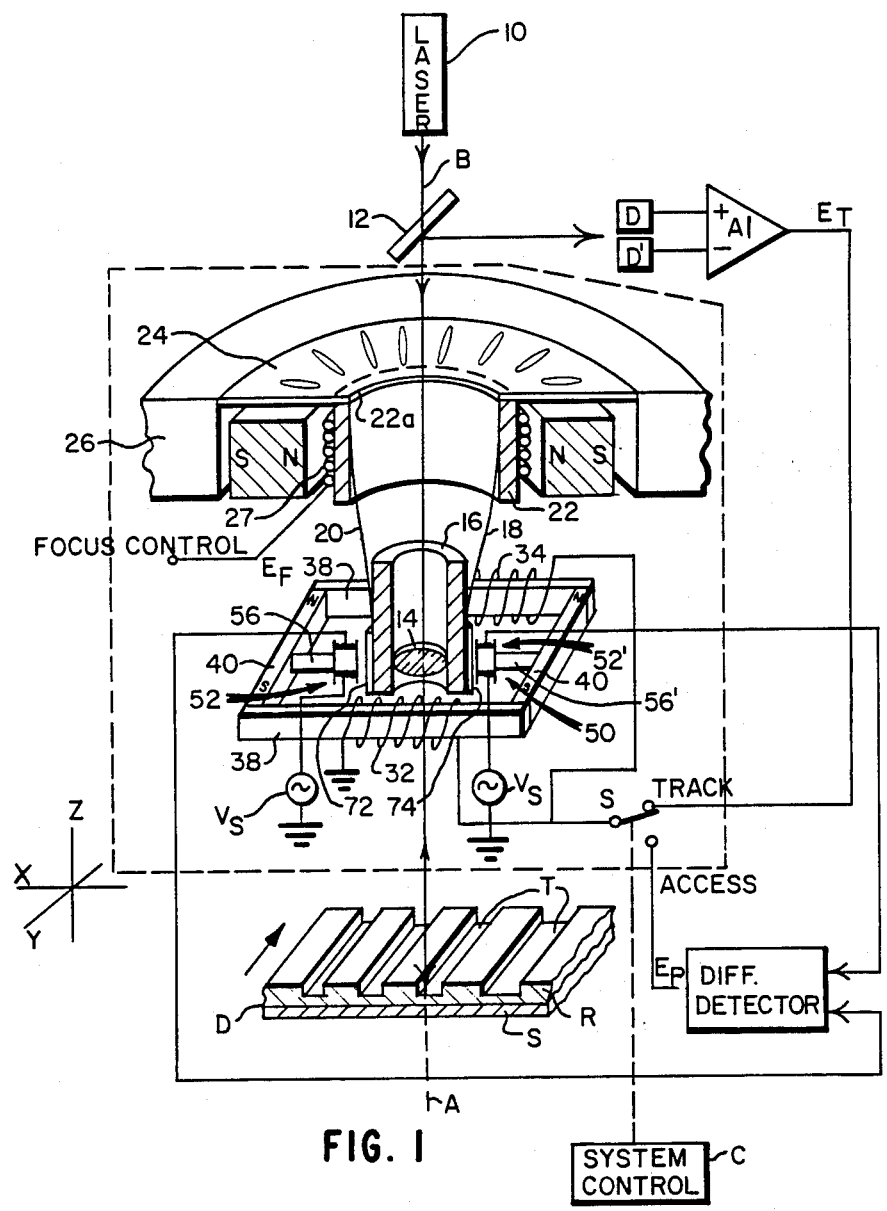
FIG. 1 is a perspective, cut-away view of a portion of an optical read/write head embodying a preferred form of the invention.

Referring now to the drawings, FIG. 1 illustrates an optical recording system embodying the lens position-sensing apparatus of the invention. As shown, such system comprises a laser 10 for producing a light beam B which, if desired, may be intensity-modulated with information to be recorded or, alternatively, may be of a lower power, continuous wave beam for reading-out information already recorded. Beam B passes through a beam-splitter 12 and an objective lens 14, the latter serving to focus the beam on the recording layer of an optical disk D or any other type of optical recording element. Disk D may comprise, for example, a rigid substrate S having a reflective recording layer R disposed thereon, such recording layer having a plurality of concentric data tracks T formed therein. Note, since this invention only concerns apparatus for controlling the tracking position of lens 14, only those components of an optical recording system which are interrelated with such apparatus is shown and described herein.

Upon striking the recording element, beam B is diffracted by the data tracks T, and the diffracted beam is reflected back along its optical path, passing again through lens 14, and then striking beam-splitter 12 where it is redirected to a pair of split detectors D and D'. In a conventional manner, detectors D and D' detect the relative intensities of the ± first order diffracted beams, and the respective outputs of the detectors are subtracted by differential amplifier A1 to provide a tracking error signal $E_T$ representing the displacement of the focused beam from a desired data track T on the recording element. During normal data recording and playback modes, the tracking error signal is sued to continuously adjust the lateral or tracking position of the lens 14 (i.e. in the x direction, perpendicular to the lens axis A) to maintain the focused beam on a desired track.

Lens 14 is, as shown, mounted inside a cylindrical metal barrel 16, typically made of steel or other ferromagnetic material. The latter is suspended by a pair of leaf springs 18, 20 which, in turn, are supported by a larger cylindrical housing 22 which is concentrically arranged with respect to barrel 16. Housing 22, in turn, is supported by a flexible, spring-like diaphragm 24 which extends between a stationary support 26 and the top edge 22a of housing 22. Focus movement of lens 14 toward and away from the recording element (along axis A) is effected by applying a focus error signal $E_F$ to a coil 27 surrounding and affixed to housing 22. In response to error signal $E_F$, coil 27 moves axially in the magnetic field provided by ring magnet 30 which concentrically surrounds the coil. Tracking movement of lens 14 in a direction perpendicular to axis A (i.e. in the X direction) is effected by applying the tracking error signal $E_T$ to a pair of coils 32, 34 positioned on opposite sides of the lens barrel 16. Coils 32 and 34 are wound about ferromagnetic members 38 extending between the ends of a pair of spaced bar magnets 40. As the tracking error signal varies, the ferromagnetic lens barrel is deflected toward one or the other bar magnets 40.

In optical recording systems of the type described so far, it is known that the tracking error signal $E_T$ will vary wildly as the optical recording head is rapidly moved in a cross track direction to access data from a track far removed from the previously sensed track. During the track jump period, the tracking servo system has no signal to lock onto and follow. The result is that the head begins to oscillate in the Y direction, and a relatively long time period (e.g. of the order of milliseconds), is required for such oscillation to damp out to the extent that the tracking servo can once again lock onto a new track. As noted above, this problem has been addressed by the prior art by physically sensing the deflection of leaf springs 18 and 20 with a piezoelectric transducer, such deflection being representative of the instantaneous lens position relative to its nominal (rest) position within the head. In its nominal position, the lens axis A would correspond to the mechanical axis of the cylindrical housing 22. The output of the piezoelectric element is fed back to the tracking servo to control the tracking error signal. This piezoelectric transducer, as already indicated, is difficult to incorporate in such optical heads and, moreover, such elements can be difficult to calibrate.

Figure 2:
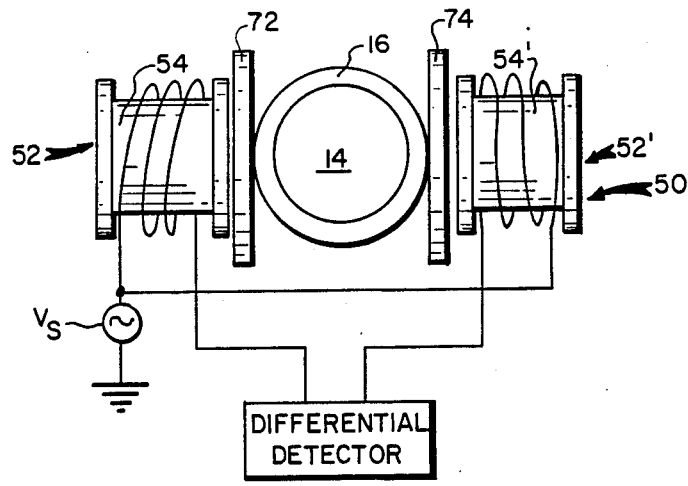
FIG. 2 is a bottom view of a portion of the FIG. 1 apparatus.
Figure 3:
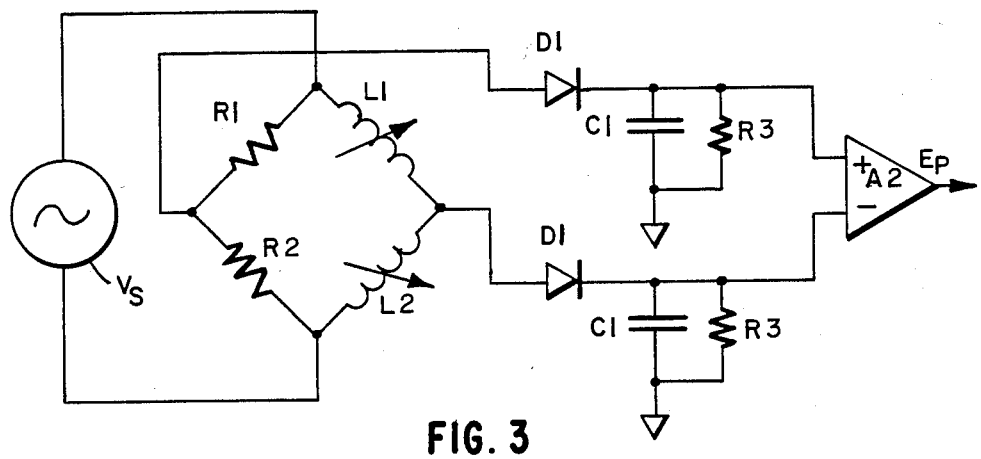
FIG. 3 is an electrical schematic showing a bridge circuit useful in implementing the invention.

Now in accordance with the present invention, the physically-contacting, piezoelectric lens position-sensor of the prior art has been eliminated, and non-contacting, variable inductance transducer means 50 has been substituted therefor. As better shown in FIG. 2 such transducer means preferably takes the form of a pair of inductance coils 52, 52' which are would upon bobbins 54, 54' located in close proximity to opposite sides of the lens barrel 16. The bobbins are supported by a pair of support arms 56, 56' extending inwardly from the opposing bar magnets 40. Each coil 52, 52' is excited by a constant amplitude, zero mean sinusoidal voltage source $V_s$ operating at a frequency at least one octave below the self resonant frequency of the coils. The output lead of each coil is fed to a differential detector which produces a lens position error signal $E_p$ representing the difference in the instantaneous inductance of each coil. Basically, the lens barrel, being conductive, acts as a shorted turn secondary transformer coil for each of the coils 52, 52'. The mutual inductive coupling between the primary and "secondary" coils of these two transformers is inversely proportional to the spacing between the coil and lens barrel 16. As the lens barrel moves closer to coil 52, the net inductance of coil 52 decreases while that of coil 52' increases. The converse is true for movement of the lens barrel in the direction of coil 52'. The differential detector for sensing the change in inductance may comprise, for example, a bridge amplifier as shown in FIG. 3. An electronic switch S, operated by the system control C, serves to selectively couple the output of the variable inductance transducer means to either the tracking error signal provided by the split detectors, or to the lens position error signal $E_p$ provided by the differential detector. In the normal record/playback modes, switch S is positioned, as shown, so as to connect the error tracking signal to the lens actuator. In a radial access or track jumping mode, the system control operates switch S to apply the lens position error signal $E_p$ to the tracking actuator coils 32, 34, thereby causing the lens, through feedback control, to remain relatively stationary relative to coils 52, 52'.

Referring to FIG. 3, a bridge amplifier circuit is shown to comprise equal value resistors R1 and R2 in conjunction with variable inductors 52 and 52'. Voltage waveforms at the junctions of the inductive and resistive bridge legs are envelope detected by the combination of diodes D1 and the filtering circuits comprising capacitors C1 and R3, and the respective outputs of the peak detectors are subtracted in a differential amplifier A2 to provide the lens position error signal $E_p$. Each of the coils 52 and 52' may comprise, for example, 420 turns of No. 45 AWG wire. Such coils have been found to produce excellent linearity from position to voltage output over a two millimeter range centered around the lens barrel rest position. The bandwidth has been found to exceed two kHz and a sensitivity of approximately three millivolts/micron has been attained when the bridge circuit is excited with a ten volt, peak-to-peak, 500 kHz sinusoidal voltage source.

While the invention has been disclosed with particular reference to a preferred embodiment, it should be apparent that modifications can be made without departing from the spirit of invention. For example, while the variable inductance transducer means has been disclosed as comprising a pair of spaced coils, it should be apparent that a single coil would suffice, although with reduced sensitivity. Also, to enhance the sensitivity of the system, a pair of highly conductive plates 72 and 74 could be positioned on opposite sides of the lens barrel, as shown in FIG. 2. When such plates have been incorporated, it is, of course, unnecessary that the lens barrel be electrically conductive. Also, plates 72 and 74 should be somewhat elongated in the direction of axis A so that the lens position error signal is independent of the focusing position of the lens.

What is claimed is:

1. An optical recording apparatus of the type comprising:

(a) means for producing a beam of radiation;
(b) a lens for focusing such beam to a spot on a moving recording medium, such medium having a plurality of spaced tracks along which data is recorded;
(c) movably mounted support means for supporting said lens for movement in a direction perpendicular to the lens axis;
(d) detector means for detecting the displacement of the focused spot relative to a desired data track and for producing a tracking error signal proportional to such displacement;
(e) tracking actuator means responsive to the error signal for adjusting the position of the lens support to continuously maintain the focused spot on a desired data track during movement of the recording medium;
(f) means for sensing the instantaneous position of the lens relative to a nominal optical axis and for providing the tracking actuator means with a lens position-sensitive signal representative of such instantaneous position, said sensing means comprising variable inductance transducer means having an instantaneous inductance determined by the instantaneous position of said movably mounted lens support means relative to a nominal position, and circuit means responsive to the instantaneous inductance of said transducer for producing said position-sensitive signal; and
(g) switching means for selectively applying either said tracking error signal or said lens position-sensitive signal to said tracking actuator means.

2. An optical recording apparatus of the type comprising:
(a) means for producing a beam of radiation;
(b) a lens for focusing such beam to a spot on a moving recording medium, such medium having a plurality of spaced tracks along which data is recorded;
(c) movably mounted support means for supporting said lens for movement in a direction perpendicular to the lens axis, said support means comprising an electrically conductive member;
(d) detector means for detecting the displacement of focused spot relative to a desired data track and for producing a tracking error signal proportional to such displacement;
(e) tracking actuator means responsive to the error signal for adjusting the position of the lens support to continuously maintain the focused spot on a desired data track during movement of the recording medium; and
(f) means for sensing the instantaneous position of the lens relative to a nominal optical axis and for providing the tracking actuator means with a lens position-sensitive signal representative of such instantaneous position, said sensing means comprising variable inductance transducer means having an instantaneous inductance determined by the instantaneous position of said movably mounted lens support means relative to a nominal position, and circuit means responsive to the instantaneous inductance of said transducer for producing said position-sensitive signal, said variable inductance transducer means comprising (i) at least one inductance coil positioned in closely spaced relation to said electrically conductive member, and (ii) an alternating current source operatively coupled to said coil, movement of said electrically conductive member relative to said coil serving to vary an inductive coupling between said coil and said member.

3. The apparatus as defined by claim 2 wherein said variable inductance transducer comprises a pair of coils positioned on opposite sides of said conductive member.

4. The apparatus as defined by claim 3 wherein said member comprises a non-conductive cylinder which surrounds and supports said lens, said cylinder also supporting a pair of electrically conductive plates, each of said plates being closely spaced from one of said coils.

5. The apparatus as defined by claim 2 wherein said member comprises a conductive cylinder adapted to surround and support said lens.

* * * * *